(No Model.)
L. E. WATERMAN.
DISK LISTER.
No. 539,495. Patented May 21, 1895.
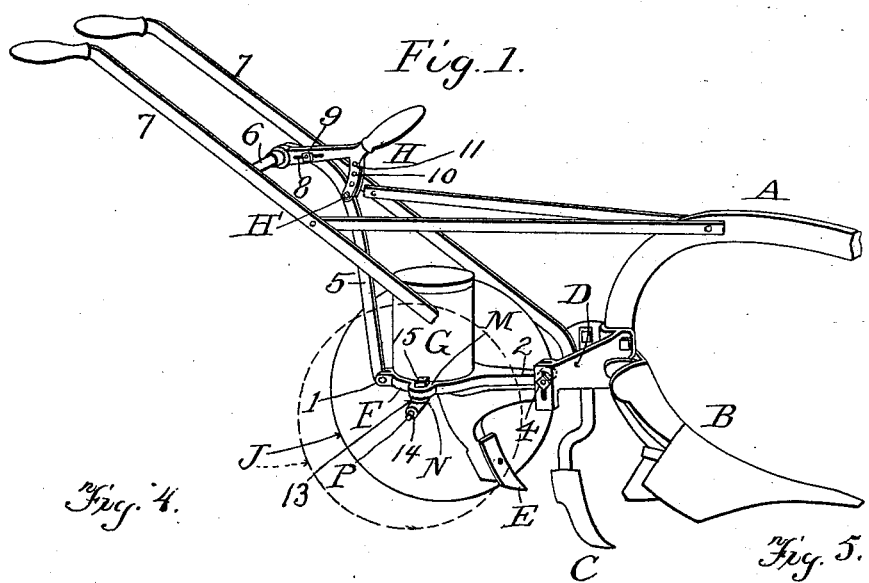
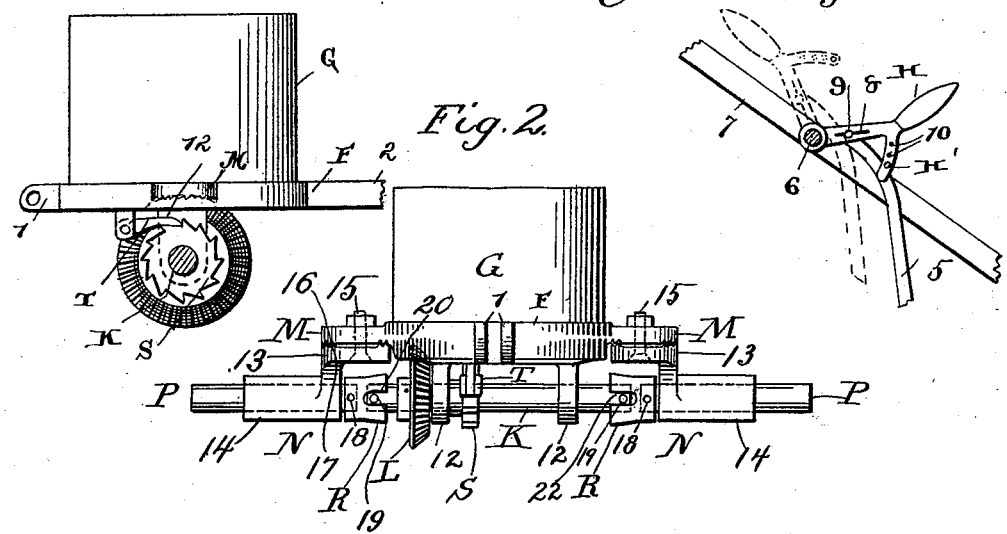
Witnesses
Inventor
Lewis E. Waterman
per John G. Manahan
his Attorney.

UNITED STATES PATENT OFFICE.

LEWIS E. WATERMAN, OF MOLINE, ASSIGNOR TO THE ROCK ISLAND PLOW COMPANY, OF ROCK ISLAND, ILLINOIS.

DISK LISTER.

SPECIFICATION forming part of Letters Patent No. 539,495, dated May 21, 1895.

Application filed January 24, 1895. Serial No. 536,058. (No model.)

*To all whom it may concern:*

Be it known that I, LEWIS E. WATERMAN, a citizen of the United States, residing at Moline, in the county of Rock Island and State of Illinois, have invented certain new and useful Improvements in Disk Listers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to improvements in disk listers, and comprises means for utilizing ordinary disks for the planting of corn and other grain, means for suspending the operation of the seeding mechanism, means for preventing the retrogression of the seed plate, and means for changing the angle of said disks with the line of movement, so as to regulate the depth of cut of said disks, and the amount of earth thrown by the latter. These purposes I accomplish by the mechanism illustrated in the accompanying drawings, in which—

Figure 1 is a perspective of a machine embodying my invention with one of the disks and one side of the mold-board removed to better exhibit the construction and mutual relation of the parts. Fig. 2 is a detail transversely of the machine, at the rear of the latter, exhibiting the method employed for varying the angle of the disks, as aforesaid, and also the seed-plate locking devices hereinafter referred to. Fig. 3 is a detail of the plate which carries the seed-hopper. Fig. 4 is a side view of the hopper and a sectional view of the operating-shaft, showing the mechanism for preventing the shaft from rotating backward in side elevation; and Fig. 5 is a broken sectional view of the mechanism for raising the planting attachment, shown in two positions.

Similar letters and numerals indicate similar parts throughout the several views.

A is a plow beam, upon the rear downward crook of which there is suitably seated the plow B, having a double mold board, and thereby adapted to open a furrow gash by throwing the earth laterally in opposite directions.

C is the sub-soiler, or small furrow opener, suitably connected to the beam A above the plow B, and extending downward below the base of said plow, and adapted to loosen the earth, in the usual mode, behind the plow B.

D is a clip, suitably attached at its forward end to the beam A behind the plow B, and extended rearward a short distance beyond the standard of the sub-soiler C. If preferred, the clip D may consist of duplicate plates, bolted to opposite sides of the beam A, and mutually connected near their rear ends by suitable transverse bolt, or bolts.

E is an ordinary seed tooth, suitably bolted to the rear end of the clip D, and extending downward into the upper part of the furrow gash made by the sub-soiler C.

F is the base of the seed hopper G, and is provided with the rear extension 1, and a front extension 2, provided at its front extremity with the transverse tubular bolt seat 3, adapted to be projected within the rear ends of the clips D, and pivotally attached to the latter by means of the transverse bolt 4. A vertical arm 5 is pivoted at its lower end to the rear extension 1 on the base plate F, and, extending upwardly therefrom, is bent backward at its upper extremity.

A hand lever H is pivoted at its rear end centrally on the round 6, between the handles 7 7 of the implement, and extended forwardly from such pivotal point. The lever H is provided near its attached end with the longitudinal slot 8. A transverse bolt 9, passing through the upper end of the arm 5, and through said slot 8, connects the upper end of said arm adjustably to said lever, near the pivotal seat of the latter.

A bifurcated segmental spur 10 extends downwardly from the central portion of the lever H, and is adapted to bestride the adjacent portion of the arm 5, and is provided with a vertical series of bolt holes 11, through any one of which a bolt H' may be inserted to rest upon the convex or front edge of arm 5, and thereby limit the descent of the latter. By means of the lever H, the base F, with its attached disks J, may be raised and carried above the surface of the earth when it is desired to suspend the operation of seeding, the front of base F pivoting on its forward bolt 4 for that purpose, and by the aforesaid bolt H' in spur 10, said seeding mechanism may be suspended at any desired depth when in operation.

The operation of the hand lever is as follows: In Fig. 1 the machine is shown in position for seeding, with the handle H projected nearly horizontally forward at the round 6. When it is desired to raise the hopper and seeding mechanism, the operator seizes the lever H at its front end and draws the free end of said lever backward beyond the round 6. When the upper bowed extremity of the arm 5 has been thus carried over and to the rear of the round 6, said arm will, by reason of the line of its pivoted ends falling behind said round remain locked in such elevated position, until the free end of the lever H is again thrown forward, as shown in Fig. 1, when the plate F, with its seeding mechanism will be returned to its normal position.

Referring to Fig. 2, 12 12 are perforated ears, formed on the bottom of the base F, and extending downwardly therefrom, and constitute bearings for the rotating transverse shaft K. On the outer side of one of the bearings 12 there is keyed on the shaft K a beveled gear L, adapted to extend upwardly slightly within the base F, and there engage and actuate the usual rotating beveled gear which carries the usual seeding mechanism within the hopper G. On each side of the base F there are formed, integral with said base, outward horizontal projections M M, the outer ends of which are circular in form.

N N are brackets, consisting of an upper horizontal portion 13, and a lower tubular part 14, extending respectively outward. The horizontal portions of the brackets N are placed, respectively, under the projections M of the base F, and bolted thereto by vertical bolts 15. The lower surface of the projections M are furnished with radial corrugations 16, and the corresponding contacting surfaces of the horizontal portion 13 of the brackets N is also furnished with radial corrugations 17, adapted to optionally engage and be engaged by corrugations 16 of extensions and held in such engagement by vertical bolts 15. By this means the brackets N may be adjusted at any point in the outward arc of the circle, of which bolts 15 are the center.

The disks J are rigidly seated on the outer ends of the spindles P, which latter are projected inwardly through the sleeve or tubular portion 14 of the brackets N. On the inner end of the spindles P there are keyed, by means of a transverse bolt 18, collars R, the open inner ends, or cavities 22, of which are projected slightly over the extremities of the shaft K. Pins 19 are seated transversely in the ends of the shaft K, and projected at each side of said shaft into slots 20 formed in the walls of the inner ends of collars R. By this means the rotation of the spindles P is communicated to the shaft K for the purpose of operating the seeding mechanism within the hopper G. The extremities of the shaft K are seated sufficiently loosely in the inner ends of the collars R to permit the adjustments above referred to of the bracket N against the lower side of the projections M.

A circular ratchet S is rigidly seated on shaft K within one of the bearings 12, and a horizontal pawl T is pivotally seated on the lower surface of base F in the rear of shaft K, and projected forwardly with its free end resting on the upper side of ratchet S, and adapted to drop successively into the recesses on the periphery of the latter, and thus prevent any casual retrogression of said shaft, or any of the seeding mechanism driven thereby.

Among the advantages of my invention are its simplicity of construction, and efficiency for the purpose intended. It will be observed that the seed is not deposited upon the hard surface of the furrow created by the plow B, but in the mellow earth stirred up in the bottom of said furrow by the sub-soiler C. This insures a quicker germination of the seed, and a more rapid subsequent growth of the plant.

The disks J, by the aforesaid partial rotation of the brackets N on bolts 15, can be adjusted to throw such quantity of earth over the seed as may be desired, said disks also operating in the usual mode to support and drive the seeding mechanism.

The forward pivotal connection of the base F, together with the lever H and its adjunctive mechanism, offers a simple and expeditious mode of intermitting the operation of seeding when turning at the ends of the field, or in transporting the implement.

What I claim as my invention, and desire to secure by Letters Patent of the United States, is—

1. The combination of the clips D, attached at their forward ends to the beam A and extending rearwardly therefrom, base F supporting the seeding mechanism, and pivotally attached at its forward end to the rear ends of the clips D, the vertical arm 5 pivotally connected at its lower end to the rear extremity of the plate F, and to round 6 at the rear of its upper extremity; the lever H, suitably fulcrumed on the frame of the machine, and provided with slot 8 and bolt 9 projected transversely through the upper end of arm 5 and through said slot; substantially as shown, and for the purpose described.

2. The combination of a seed plate base F, hinged at its forward end to the frame of the machine, the lever H fulcrumed upon the handles 7 of the implement and provided with slot 8, and the bifurcated projection 10 provided with openings 11, extended downwardly from said lever and adapted to bestride and rest upon the front edge of the arm 5, and the arm 5 pivotally connected to said lever near its pivotal seat, and, extending downwardly therefrom, pivotally attached at its lower end to the rear of the base F; substantially as shown, and for the purpose specified.

3. In a disk lister, the combination of a seed hopper base F provided with lateral projections M, brackets N adjustably attached to said projections and provided with sleeves 14, the shaft K suitably journaled to the bottom of base F and provided with gear L and with transverse pins 19, the spindles P loosely projected through the sleeves 14 and provided with a collar 18, having slot 20 and adapted to receive the adjacent ends of the shaft K; substantially as shown, and for the purpose described.

4. The combination of the disks J rigidly seated upon spindles P, seated loosely in sleeves 14 of bracket N, and provided at their inner ends with the horizontal cavities 22, having slots 20 formed in the walls thereof, a suitably seated shaft K provided with transverse pins 19 adapted to be engaged by the slots 20 when said shaft has its extremities seated in the cavities 22 of sleeves 14, seed hopper G containing suitable rotating seed mechanism, gear L rigidly seated on shaft K and adapted to engage and actuate the seeding mechanism within the hopper G; substantially as shown, and for the purpose specified.

5. The combination of the seed mechanism base F having lateral projections M provided with radial, corrugations 16, bracket N having a flat upper portion 13 provided with corrugations 17, a vertical bolt 15 seated centrally in projections M and horizontal portion 13 and adapted to retain said parts at any selected portion of the pivotal semi-rotation of bracket N, and shaft K provided with gear L adapted to engage the seeding mechanism within the hopper G; substantially as shown, and for the purpose specified.

6. In a disk lister, the combination of the seed supporting base F provided with lateral projections M having corrugations on their under surface, brackets N having horizontal portions 13 provided with corrugations on their upper surface, and adapted to be held rigidly in contact with the lower surface of projections M in variant positions, and also provided with lower horizontal sleeve 14, disks J, spindles P journaled in the sleeves 14, shaft K pivotally connected at each end by means of a universal joint with the inner ends of spindles P and vertical bolts 15, whereby the positions of the disks J, in relation to each other and with the line of movement of the machine, can be varied as desired; substantially as shown, and for the purpose described.

7. In a disk lister, the combination of a transverse shaft K suitably journaled under the base of the seed hopper, and provided with the gear L adapted to engage and actuate the seeding mechanism within said hopper, spindles P adjustably supporting said base and connected at their inner ends to the extremities of said shaft, and means substantially as shown for varying the position radially of said spindles in reference to the base of said hopper; for the purpose specified.

8. In a disk lister the combination of a driving shaft K, spindles P provided with disks J and flexibly connected at their inner ends with the extremities of said shaft, the base plate F provided with lateral extensions M having a roughened under surface 16, brackets N having the outwardly extending sleeves 14 loosely seated on said spindles, and the horizontal portion 13 provided with the upper roughened surface 17, adapted to be adjustably held in contact with the under surface of the projections M, and the tightening bolts 15; substantially as shown, and for the purpose described.

9. In a disk lister the combination of the seed hopper base F, provided with lateral projections M, spindles P having a flexible connection at their inner ends, disks J seated on said spindles, and brackets N sleeved on said spindles and radially adjustable on said projections, whereby the relative positions of said disks may be varied for the purpose specified; substantially as shown and for the purpose described.

In testimony whereof I affix my signature in presence of two witnesses.

LEWIS E. WATERMAN.

Witnesses:
W. J. KAHLKE,
GEO. H. SHELDON.